(12) United States Patent
Agrawal et al.

(10) Patent No.: US 7,890,774 B2
(45) Date of Patent: Feb. 15, 2011

(54) SYSTEM AND METHOD FOR FAST QUERYING OF ENCRYPTED DATABASES

(75) Inventors: Rakesh Agrawal, San Jose, CA (US); Gerald George Kiernan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 12/128,836

(22) Filed: May 29, 2008

(65) Prior Publication Data

US 2009/0327748 A1 Dec. 31, 2009

Related U.S. Application Data

(63) Continuation of application No. 10/752,121, filed on Jan. 5, 2004, now Pat. No. 7,395,437.

(51) Int. Cl.
*G06F 11/30* (2006.01)
*G06F 12/14* (2006.01)

(52) U.S. Cl. ..................................... 713/193
(58) Field of Classification Search .................. 713/193
See application file for complete search history.

(56) References Cited

U.S. PATENT DOCUMENTS

| | | | |
|---|---|---|---|
| 5,848,404 A | 12/1998 | Hafner et al. | |
| 5,963,642 A | 10/1999 | Goldstein | |
| 6,148,342 A | 11/2000 | Ho | |
| 6,269,359 B1 | 7/2001 | Sekine | |
| 6,983,365 B1 | 1/2006 | Douceur et al. | 713/165 |
| 7,395,437 B2 * | 7/2008 | Agrawal et al. | 713/193 |
| 2002/0076044 A1 | 6/2002 | Pires | 380/37 |
| 2002/0104002 A1 | 8/2002 | Nishizawa et al. | |
| 2002/0129260 A1 | 9/2002 | Benfield et al. | |

OTHER PUBLICATIONS

R. Agrawal, J. Kiernan, R. Srikant, and Y. Xu. Hippocratic databases. In 28th Int=l. Conference on Very Large Databases, Hong Kong, China, Aug. 2002.
N. Ahituv, Y. Lapid, and S. Neumann. Processing encrypted data. Communications of the ACM, 30(9):777-780, 1987.
L. Bouganim and P. Pucheral. Chip-secured data access: Confidential data on untrusted servers. In Proc. of the VLDB Conference, p. 131-142, Hong Kong, China, Aug. 2002.

(Continued)

*Primary Examiner*—Benjamin E Lanier
*Assistant Examiner*—Cordelia Zecher
(74) *Attorney, Agent, or Firm*—Jon A. Gibbons; Fleit Gibbons Gutman Bongini & Bianco PL

(57) ABSTRACT

A system, method, computer program product, and data management service that allows any comparison operation to be applied on encrypted data, without first decrypting the operands. The encryption scheme of the invention allows equality and range queries as well as the aggregation operations of MAX, MIN, and COUNT. The GROUPBY and ORDERBY operations can also be directly applied. Query results produced using the invention are sound and complete, the invention is robust against cryptanalysis, and its security strictly relies on the choice of a private key. Order-preserving encryption allows standard database indexes to be built over encrypted tables. The invention can easily be integrated with existing systems.

22 Claims, 10 Drawing Sheets

OTHER PUBLICATIONS

C. Boyens and O. Gunther. Trust is not enough: Privacy and security in ASP and web service environments. In 6th East-European Conference on Advances in Databases and Information Systems, Bratislava, Slovakia, Sep. 2002.

D. Comer. The ubiquitous B-tree. ACM Computing Surveys, 11(2):121-138, Jun. 1979.

D. Denning. Cryptography and Data Security. Addison-Wesley, 1982.

J. Domingo-Ferror and J. Herrera-Joancomarti. A privacy homomorphism allowing field operations on encrypted data, 1998.

J. Domingo-Ferror. A new privacy homomorphism and applications. Information Processing Letters, 60(5):277-282, 1996.

J. Feigenbaum, M.Y. Liberman, and R.N. Wright. Cryptographic protection of databases and software. In Proc. of the DIMACS Workshop on Distributed Computing and Cryptography, 1990.

E.A. Fox, Q.F. Chen, A.M. Daoud, and L.S. Heath. Order-preserving minimal perfect hash functions and information retrieval. ACM Transactions on Information Systems (TOIS), 9:281-308, 1991.

H. Hacigumus, B.R. Iyer, C. Li, and S. Mehrotra. Executing SQL over encrypted data in the database-service-provider model. In Proc. of the ACM SIGMOD Conf. on Management of Data, Madison, Wisconsin, Jun. 2002.

H. Hacigumus, B.R. Iyer, and S. Mehrotra. Providing database as a service. In Proc. of the Int=l. Conf. on Data Engineering, San Jose, California, Mar. 2002.

A. Kerckhoffs. Le cryptographie militaire. Journal des Sciences Militaires, 9:5-38, Jan. 1883.

National Institute of Standards and Technology, U.S. Department of Commerce. Digital Signature Standard, May 1994.

Oracle Corporation. Database Encryption in Oracle 8i, Aug. 2000.

R. Rivest. The MD5 message digest algorithm. RFC 1320, Apr. 1992.

R.L. Rivest, L. Adelman, and M.L. Dertouzos. On data banks and privacy homomorphisms. In Foundations of Secure Computation, p. 169-178, 1978.

B. Schneier. Applied Cryptography. John Wiley, second edition, 1996.

D.X. Song, D. Wagner, and A. Perrig. Practical techniques for searches on encrypted data. In IEEE Symp. on Security and Privacy, Oakland, California, 2000.

R. Vingralek. Gnatdb: A small-footprint, secure database system. In Proc. of the VLDB Conference, p. 884-893, Hong Kong, China, Aug. 2002.

* cited by examiner

| | |
|---|---|
| $G$ | Cryptographically secure Pseudo random number generator |
| $K$ | private key used to seed $G$ |
| $P$ | Plaintext, $P_i$ is segment $i$ in $P$ |
| $C$ | Ciphertext, $C_i$ is segment $i$ in $C$ |
| $\|P\|\ (\|C\|)$ | Length of $P$ ($C$) |
| $V_P\ (V_C)$ | Numeric value of $P$ ($C$) |
| $\gamma$ | Relationship between $\|P\|$ and $\|C\|$, $\|C\| = \lceil \gamma_i \times \|P_i\| \rceil, \gamma_i > 1$ |
| $N$ | Number of segments in $P$ and $C$ |
| $S$ | Maximum length of a segment in $P$ |

FIG. 3

| Value | Plaintext | | Ciphertext |
| --- | --- | --- | --- |
| $V_{P_0}$ | $P_0$ | $P_1, \ldots, P_{N-1}$ | $C_0$ $C_1, \ldots, C_{N-1}$ |
| 0 | 000 | | 000100 |
| 1 | 001 | | 000111 |
| 2 | 010 | | 001001 |
| 3 | 011 | | 001011 |
| 4 | 100 | | 001100 |
| 5 | 101 | | 001101 |
| 5 | 101 | | 001101 |
| 5 | 101 | | 001101 |
| 6 | 110 | | 010101 |
| 7 | 111 | | 010111 |

FIG. 5

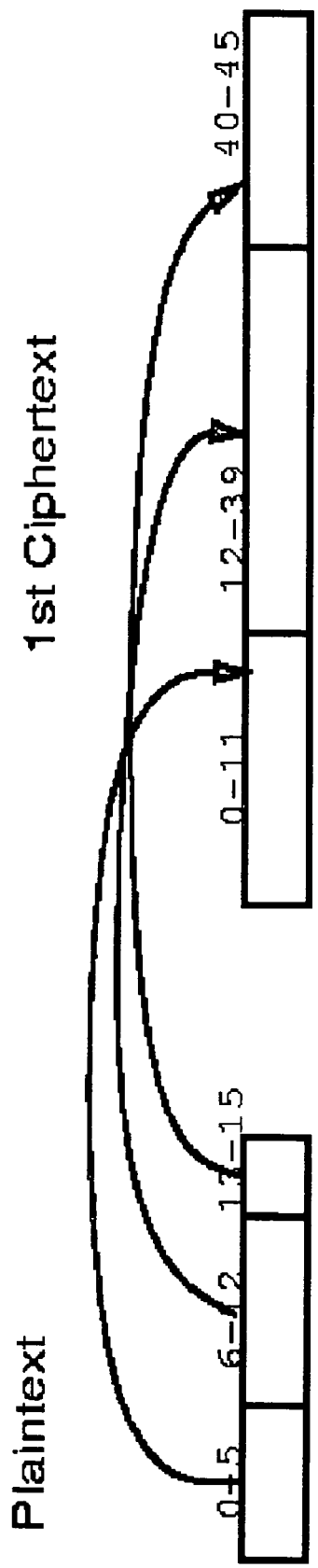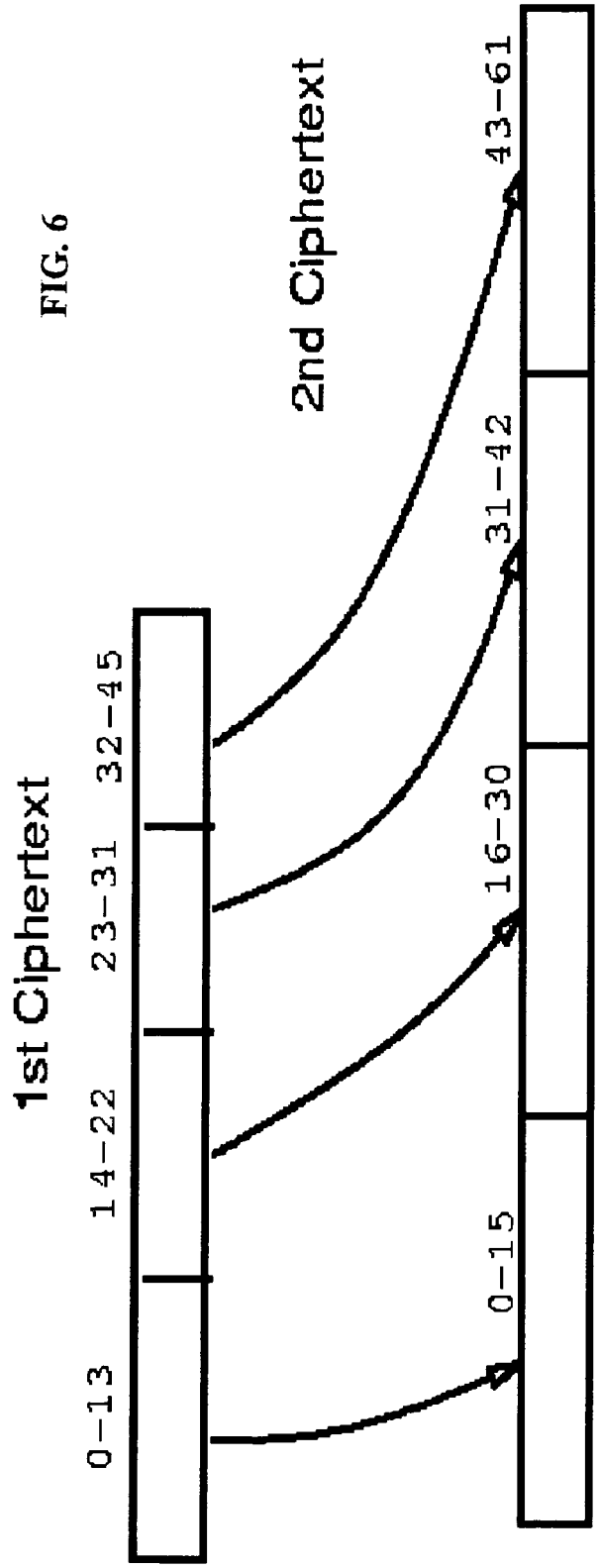
FIG. 6

(A) Original values (B) Encrypted values, $|P_i| = 2$ bits, $\gamma_i = 1.5$

FIG. 8C
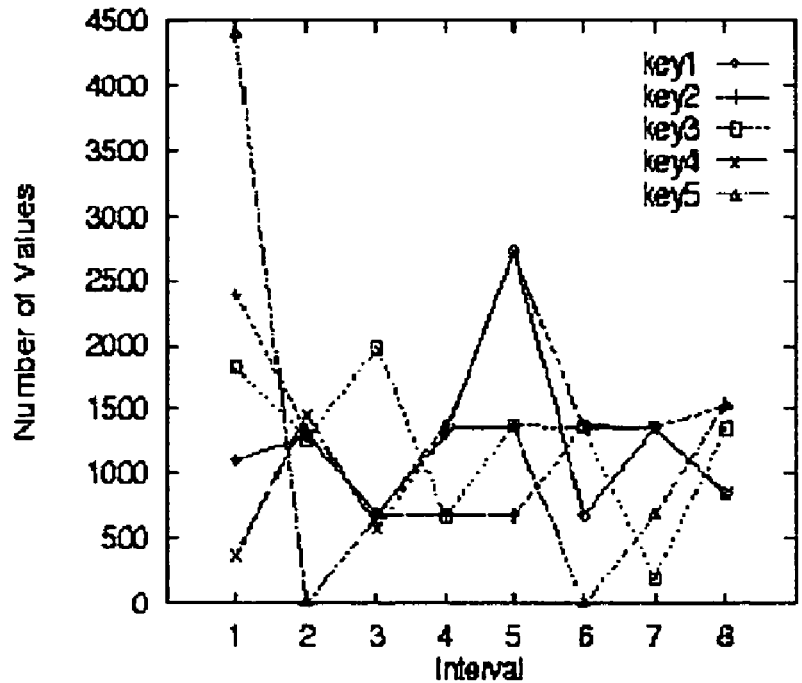
(C) Encrypted values, $|P_i| = 4$ bits, $\gamma_i = 1.5$
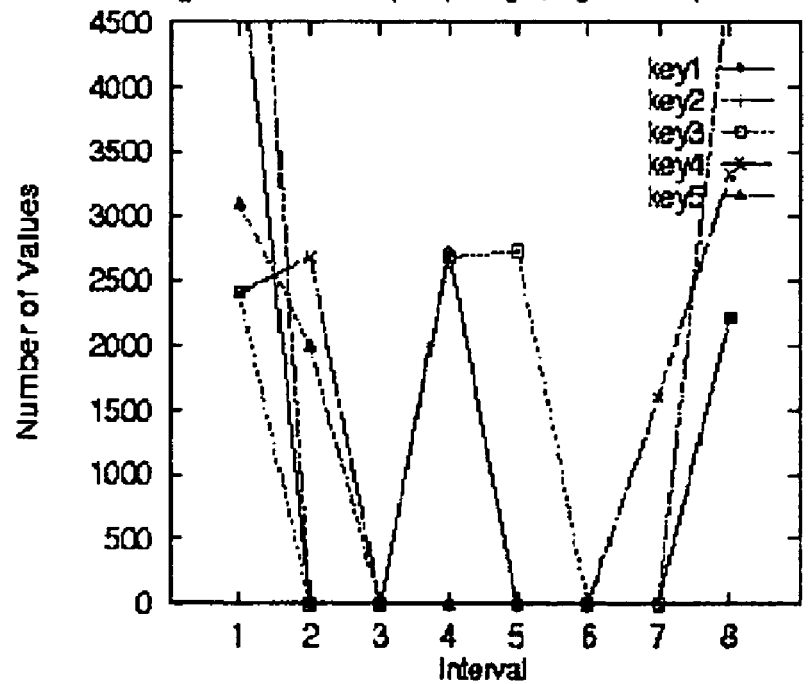
(D) Encrypted values, $|P_i| \in [2, 4]$ bits, $\gamma_i = 2.0$
FIG. 8D

SYSTEM AND METHOD FOR FAST QUERYING OF ENCRYPTED DATABASES

CROSS-REFERENCE TO RELATED APPLICATIONS

This application is based upon and claims priority from prior U.S. patent application Ser. No. 10/752,121, filed on Jan. 5, 2004, now U.S. Pat. No. 7,395,437, the entire disclosure of which is herein incorporated by reference in its entirety.

FIELD OF THE INVENTION

This invention relates to encrypting private data such that comparison operations can be directly performed. Specifically, the invention can perform equality and range queries, the aggregation operations of MAX, MIN, and COUNT, as well as GROUPBY and ORDERBY operations, directly on encrypted data without first decrypting the operands.

BACKGROUND OF THE INVENTION

Encryption is a well established technique for protecting sensitive data, such as confidential and personal financial or medical information, that may be stored in database systems. The data is often encrypted to prevent access by unauthorized persons or an untrusted system administrator, or to increase security of client/server type systems. See for example U.S. Pat. No. 6,148,342 and U.S. Patent Application Publications 2002/0104002A1 and 2002/0129260A1. However, once encrypted, the data can no longer be easily queried (aside from exact matches).

In their classic paper [19], Rivest, Adleman, and Dertouzos point out that the limit on manipulating encrypted data arises from the choice of encryption functions used, and there exist encryption functions that permit encrypted data to be operated on directly for many sets of interesting operations. They call these special encryption functions "privacy homomorphisms". The focus of [19] and the subsequent follow-up work [2, 4, 9, 10] has been on designing privacy homomorphisms to enable arithmetic operations on encrypted data. Comparison operations were excluded from this line of research, though; it was observed in [19] that there is no secure privacy homomorphism if both comparison operations and arithmetic operations were included.

Note, cryptography purists may object to this use of the term "encrypted"; they may define the term to mean that absolutely no information about the original data can be derived without decryption. In this application, the term "encrypted" generally refers to the results of mathematical efforts to balance the confidentiality of data while allowing some computations on that data without first requiring decryption (which is typically a computationally expensive alternative). The data is perhaps "cloaked" or "disguised" more than "encrypted" would imply in a strict cryptographic sense.

Hacigumus et al. proposed a clever idea in [13] to index encrypted data in the context of a service-provider model for managing data. Tuples are stored encrypted on the server, which is assumed to be untrusted. For every attribute of a tuple, a bucket id is also stored that represents the partition to which the unencrypted value belongs. This bucket id is used for indexing. Before issuing a selection query to the server, the client transforms the query, using bucket ids in place of query constants. The result of the query is generally the superset of the answer, which is filtered by the client after decrypting the tuples returned by the server. Projection requires fetching complete tuples and then selecting the columns of interest in the client. Aggregation also requires decrypting the values in the client before applying the aggregation operation.

Feigenbaum et al. propose a simple but effective scheme in [11] to encrypt a look-up directory consisting of (key, value) pairs. The goal is to allow the corresponding value to be retrieved if and only if a valid key is provided. The essential idea is to encrypt the tuples as in [13], but associate with every tuple the one-way hash value of its key. Thus, no tuple will be retrieved if an invalid key is presented. Answering range queries was not a goal of this system.

In [21], Song et al. propose novel schemes to support key word searches over an encrypted text repository. The driving application for this work is the efficient retrieval of encrypted email messages. They do not discuss relational queries and it is not clear how their techniques can be adapted for relational databases.

In [3], Bouganim et al. use a smart card with encryption and query processing capabilities to ensure the authorized and secure retrieval of encrypted data stored on untrusted servers. Encryption keys are maintained on the smart card. The smart card can translate exact match queries into equivalent queries over encrypted data. However, the range queries require creating a disjunction for every possible value in the range, which is infeasible for data types such as strings and reals. The smart card implementation could benefit from an encryption scheme wherein range queries could be translated into equivalent queries over encrypted data.

In [23], Vingralek explores the security and tamper resistance of a database stored on a smart card. The author considers snooping attacks for secrecy, and spoofing, splicing, and replay attacks for tamper resistance. Retrieval performance is not the focus of this work and it is not clear how much of the techniques apply to general purpose databases not stored in specialized devices.

Among commercial database products, Oracle 8i allows values in any of the columns of a table to be encrypted [17]. However, the encrypted column can no longer participate in indexing as the encryption is not order-preserving.

Related work also includes research on order-preserving hashing [7, 12]. However, protecting the hash values from cryptanalysis is not the concern of this body of work. Similarly, the construction of original values from the hash values is not required. One-way functions [16, 18] ensure that the original values cannot be recovered from the hash values.

A scheme for performing comparison operations directly on encrypted data without first performing a decryption of the data is therefore needed.

SUMMARY OF THE INVENTION

It is accordingly an object of this invention to provide a system, method, a computer program product, and a data management service for automatically querying encrypted data. The invention partitions plaintext data (e.g. column values) into a number of segments, then encrypts each plaintext into ciphertexts in an order-preserving segmented manner. The invention then performs comparison queries on the numerical values of the ciphertexts, and decrypts the query results. Specifically, the invention can perform equality and range queries, the aggregation operations of MAX, MIN, and COUNT, as well as GROUPBY and ORDERBY operations, directly on encrypted data without first decrypting the operands.

The partitioning can be performed once for a given column for simplicity, or independently for each plaintext for heightened security. The segment sizes are variable, and can be chosen by calling a cryptographically secure pseudorandom number generator a number of times. The generator uses as a seed a private key concatenated with a string that can include for example the name of the column from which plaintexts are selected. The seed determines the random sequence of positive integers created by successive calls to the generator.

The invention performs the encryption by encoding each segment of each plaintext into a corresponding segment of a corresponding ciphertext with the generator. The invention provides the generator with a particular seed value, using a private key concatenated with a first string and a second string for the seed. The first string is typically the name of the column from which plaintexts are selected and the second string is typically arbitrary.

The ciphertext segments may be expanded in size in comparison to the plaintext segments; an expansion factor of 1.5 has been found to work well. The encoding is based on the summation of the results of a number of calls to the generator. A corresponding decryption methodology is provided.

For the independent partitioning case, the length of the first segment is selected by calling the generator. The lengths of subsequent segments are each chosen by calling the generator again, using as a seed the private key concatenated with the contents of previous segments. The expansion factor is also determined by calling the generator. For additional security, the resulting ciphertext segments may be encoded by calling the generator yet again, using a different generator seed. Multiple ciphertext values may be created for nulls by assigning any one of the random values that is greater than the largest encrypted value of a column.

The foregoing objects are believed to be satisfied by the embodiments of the present invention as described below.

BRIEF DESCRIPTION OF THE DRAWINGS

FIG. 3 is a diagram summarizing important notations describing the present invention.

FIG. 5 is a diagram illustrating an attack that deciphers the percentiles of a ciphertext.

FIG. 6 is a diagram illustrating a double encryption scheme of the present invention to thwart the attack of FIG. 5.

FIGS. 7A-7D and 8A-8D depict results of robustness testing of the present invention.

DETAILED DESCRIPTION OF THE INVENTION

The invention is an encryption scheme that allows any comparison operation to be applied on encrypted data, without decrypting the operands. The invention allows equality and range queries as well as the aggregation operations of MAX, MIN, and COUNT to be applied on encrypted data. The GROUPBY and ORDERBY operations can also be directly applied without prior decryption. The invention may be embodied as a method, a system, a computer program product, and as a data management service.

The invention cannot directly perform arithmetic operations because of the inherent limitation of privacy homomorphisms; e.g. before applying SUM or AVG to a group, the values to be added require decryption. Similarly, a predicate containing an arithmetic expression cannot be directly evaluated by the invention.

Application Environment

Figure 1:
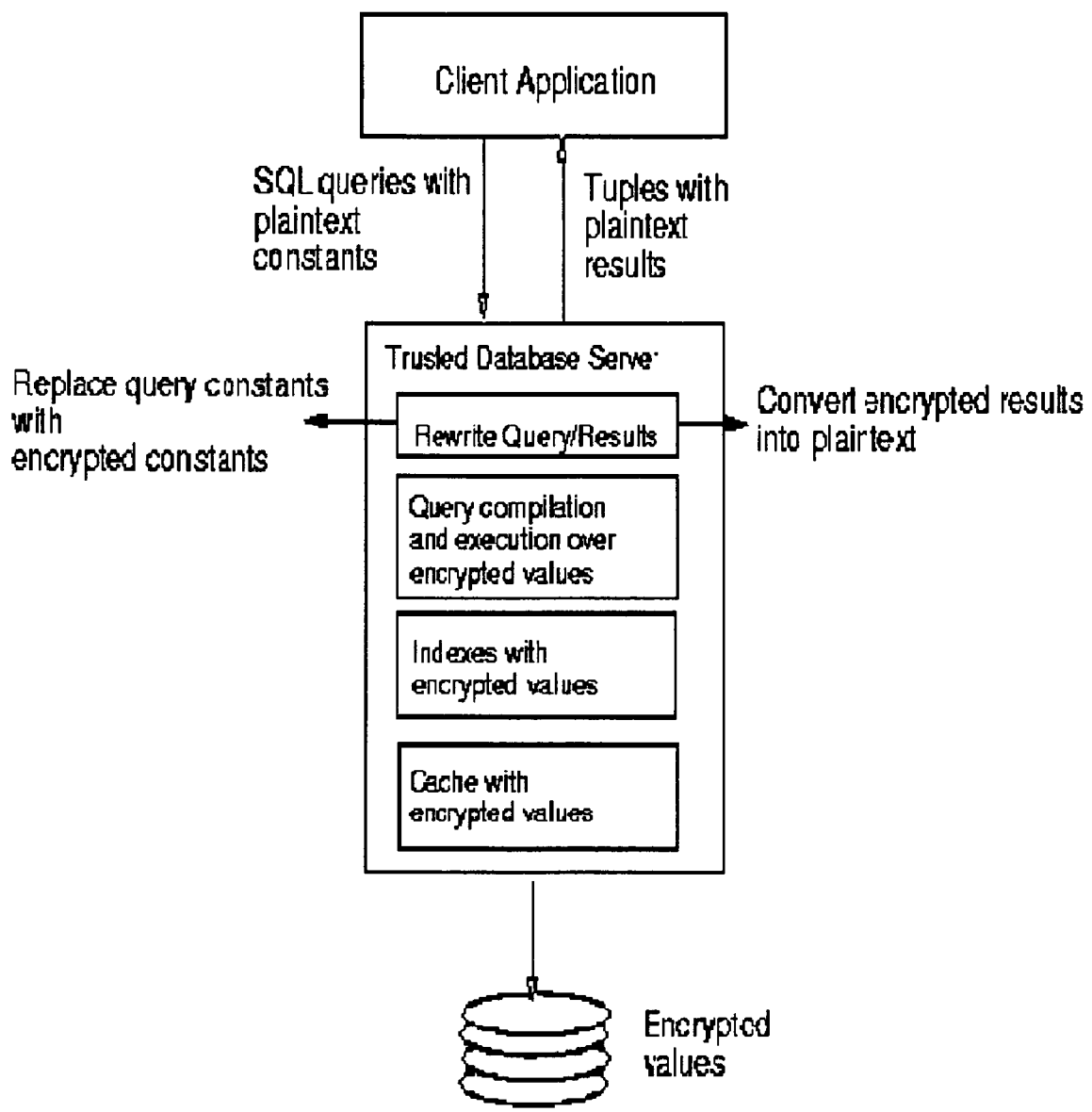
FIG. 1 is a diagram of the architecture for integrating the encryption scheme of the present invention with a trusted database system with vulnerable storage.

The invention was motivated by the challenge posed in [1] to develop indexing techniques for encrypted data to realize the vision of Hippocratic databases. The database server is a trusted entity in this application and the goal of encryption is to protect database files from intruders. FIG. 1 shows the architecture for integrating the encryption scheme with the database system in this environment. The tasks of encrypting query constants and decrypting query results are integrated in the database server as query pre-processing and post-processing steps. The rest of the query processing remains unaffected, so this service can easily be integrated within existing systems.

Figure 2:
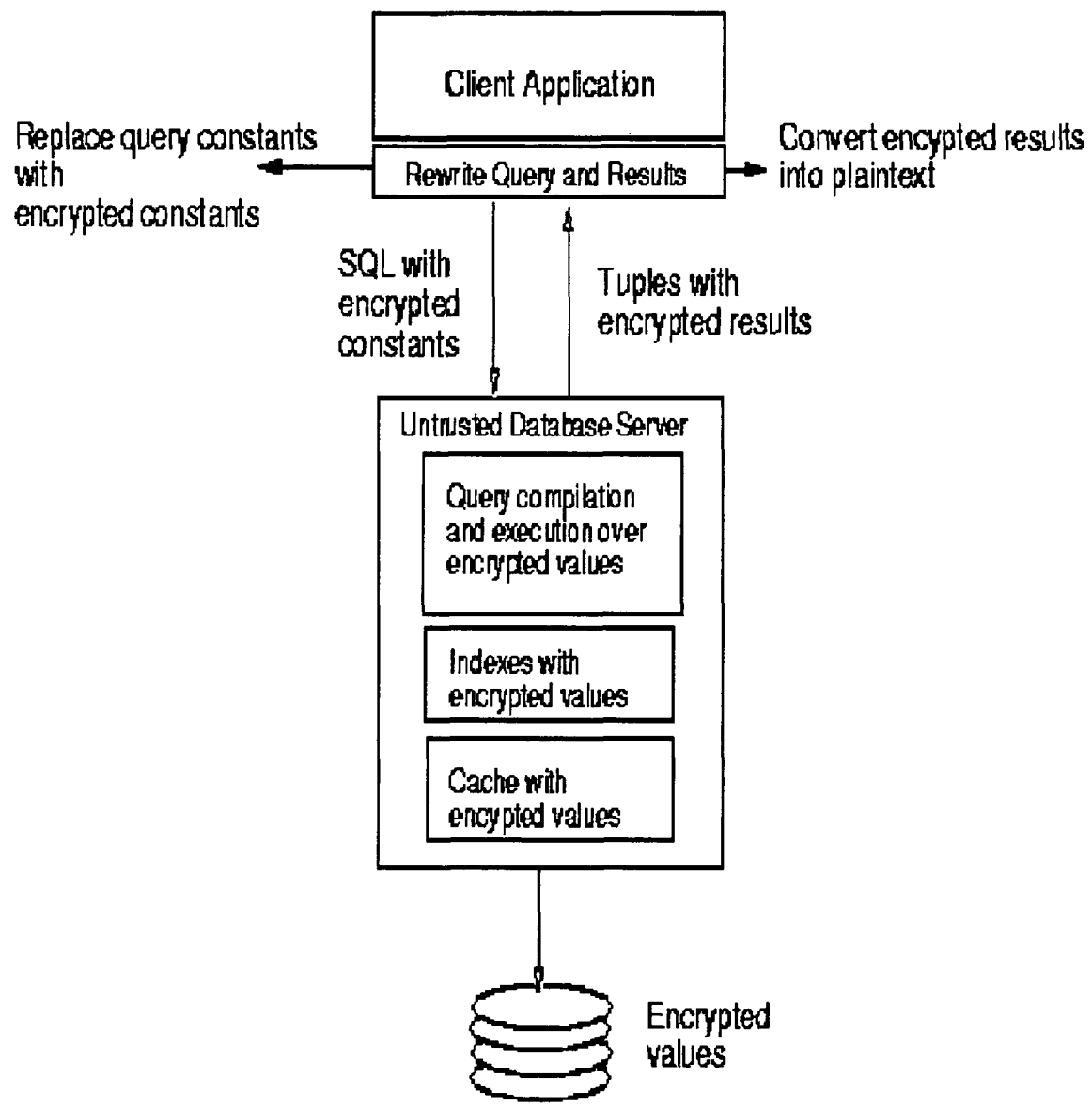
FIG. 2 is a diagram of the architecture for integrating the encryption scheme of the present invention with an untrusted database system.

The invention can also be used, albeit with the caveat given below, in a "database as a service" model of data management, described in [4, 13, 14]. The database server is untrusted in this environment and the goal of encryption is to prevent the server from violating the privacy of the data it stores. FIG. 2 shows the architecture for integrating the encryption scheme in this environment. Only the database client requires modification, and only for encrypting the query constants and decrypting the query results. This architecture can also be employed in conjunction with a smart card [3] for authorized and secure querying of an encrypted database.

Note that the invention provides protection from snooping, but it is not tamper proof. A malicious database system can update a tuple by substituting encrypted values from some other tuples. Similarly, it can delete some tuples and replace them with fake tuples synthesized using encrypted values from other tuples. In general, achieving tamper resistance is difficult, notwithstanding efforts to develop specialized solutions such as those for databases resident on smart cards [23]. For example, the database system can always withhold some random tuples from a query result and inject them into some other result. This is not an issue in a trusted database environment where the goal is to protect database files from intruders. However, the threat model in a server-provider setting requires further elaboration before ascertaining the feasibility of using the invention in this environment. Thus, the present invention is assumed to be employed in the application environment of FIG. 1.

A system for querying encrypted data should have certain desirable properties:

Direct Processing of Queries

It should be possible to process queries without first decrypting the data. The need for decryption should arise only for presenting the final results.

The encryption scheme of the present invention has been designed for direct processing of queries containing range and equality predicates, MAX, MIN, and COUNT aggregations, and GROUPBY and ORDERBY clauses. However, SUM and AVG require preliminary decryption. (It is, of course, possible to create two encrypted versions of a database. One version can use techniques from [2, 4, 9, 10, 19] to process SUM and AVG queries; the other version can use the scheme of the present invention for the rest of the queries. However, preliminary decryption will still be required for queries that mix these two types of operations.)

No False Hits or False Drops

Queries over encrypted data should not contain false hits, necessitating filtering in a post-processing step after decryption. This property deems a system that produces a superset of answers as less attractive from a performance point of view. Of course, queries over encrypted data should also not miss any answers.

For queries of interest, the encryption scheme of the present invention produces results that are sound (with no false hits) and complete (with no false drops).

Key-Based System

The encryption system should assume that the encryption algorithm is public. The folly of "security-by-obscurity" has been shown repeatedly since the first enunciation of Kerckhoffs' principle in 1883 [15].

The strength of the encryption scheme of the present invention relies on the choice of a private key known only to the data's owner. This key is used to seed a cryptographically secure pseudo-random number generator. Public knowledge of the encryption scheme is assumed.

Robustness

Different levels of attacks against a cryptosystem have been conventionally categorized as follows [20, 22]:
1. Ciphertext only=the cryptanalyst only has access to several encrypted texts (ciphertexts).
2. Known plaintext=the cryptanalyst has access to several ciphertexts as well as their corresponding plaintexts.
3. Chosen plaintext=the cryptanalyst can choose any plaintext and encrypt it into the corresponding ciphertext.
4. Chosen ciphertext=the cryptanalyst can choose any ciphertext and decrypt it into the corresponding plaintext.

The goal of cryptanalysis is to compute the private key K that was used in the encryption [20, 22]. Discovering the private key of the present encryption system is as hard as discovering the private key from sequences of numbers generated from a cryptographically secure pseudo-random number generator.

Percentile Exposure

In a Hippocratic database application, it might not be necessary for an attacker to compute the precise decryption P of a ciphertext C. For sensitive numeric data, a privacy breach can occur if C can be estimated within a small interval of the domain of P. In fact, it might be sufficient to estimate the percentile in the domain of P to which C belongs. Let us call it percentile exposure.

Unfortunately, we have the following negative result:

Observation 1: Any order-preserving encryption has percentile exposure against a chosen plaintext or a chosen ciphertext attack.

The following is also true:

Observation 2: Any order-preserving encryption has percentile exposure against a known plaintext attack if a large number of plaintexts, distributed uniformly over the domain of plaintexts, are available to the attacker.

Fortunately, in the application environments of interest, it is adequate to have robustness against the percentile exposure in the presence of ciphertext-only attack. The encryption scheme of the present invention has been designed to withstand these threats.

Integration with Existing Systems

The encryption system should not require large architectural changes for its use in existing database systems. Order-preserving encryption allows standard database indexes [6] to be built over encrypted data, so the integration of the present invention with existing database systems requires only minimal changes. Encryption only doubles the space requirement.

The query results of the present invention are free of any false hits because only the columns of interest are retrieved into the client, as the column values are individually encrypted, rather than the whole tuples. Finally, the client does not need to maintain any metadata beyond the encryption keys.

We begin by giving a basic encryption scheme in section 1 below, which will then be enhanced to make it robust in section 2. FIG. 3 gives a summary of the important notations.

1. Basic Algorithms 1.1 Preliminaries

We refer to a column value in a table that needs to be encrypted as plaintext and its encryption as ciphertext. For ease of exposition, we will assume that the plaintexts are bit strings, all of equal length. Their encryptions will also be bit strings, which will also be of equal length in this section, but not so in the next section. We use lexicographic ordering v to compare bit strings.

The encryption security and indexing efficiency of the invention depend on the scheme used for partitioning domain values. In general, one would want to use fine-grained partitioning to minimize false hits. Experiments reported in [13] show the excessive performance overhead of coarse-grained partitioning. Unfortunately, fine-grained partitioning opens the door to percentile exposure. It also increases the complexity of transformed queries. For example, a simple range query will be transformed into as many disjunctions as the number of buckets that lie in that range. Yet another disadvantage of fine-grained partitioning is that it increases the amount of metadata that needs to be managed by the client, increasing its complexity. In the limiting case where each distinct value gets its own partition, the amount of metadata will be of the same order as the domain size.

Represent by P the plaintext of length $|P|$ and by C its ciphertext of length $|C|$. Treating the first bit as most significant, we use $V_P$ to represent the unsigned numeric value of P, and similarly for C. Clearly, if $|P^1|=|P^2|$, then $P^1$ v $P^2$ iff $V_{P1} > V_{P2}$.

The algorithms of the present invention make use of a cryptographically secure pseudo-random number generator G. The generator is seeded with a private key K. The key is usually concatenated with another string (which need not be kept secret) for generating different seeds. The seed determines the random sequence of positive integers generated by successive calls to G. If one does not know the seed, it is computationally infeasible to predict the number produced by the next call to G. See [20, 22] for examples of G. One-way functions are used as the building blocks in the cryptographically secure random number generators employed by the invention.

1.2 Encryption Algorithm

The encryption algorithm comprises two steps:
1. Define a Partitioning Scheme. Plaintexts and ciphertexts are partitioned into N variable-length segments. The $i^{th}$ segment of a plaintext is encoded into the $i^{th}$ segment of its ciphertext. A private key K is used to determine different segment sizes.
2. Encode Values. For every plaintext, the ciphertext counterpart of each of its segments is computed, again under the control of the private key K.

1.2.1 Partitioning

The scheme for mapping plaintexts into ciphertexts is determined as follows.

1. Divide P into N segments, their lengths determined using the sequence of non-zero numbers generated by N calls to G.
2. Divide C also into N segments. The length $|C_i|$ of the ciphertext segment $C_i$ is given by $|C|=\delta\gamma_i\times|P_i|\epsilon$, $1<\gamma_i\leq\Gamma$.

The expansion factors $\gamma i$ are determined by making N calls to G.

This step is performed only once for a given column, which results in identical partitions for all the plaintexts in a column. All the ciphertexts for a column will also have identical partitions and will be of equal length. G is seeded with the private key K concatenated with the column name to generate different partitioning for different columns.

Figure 4:
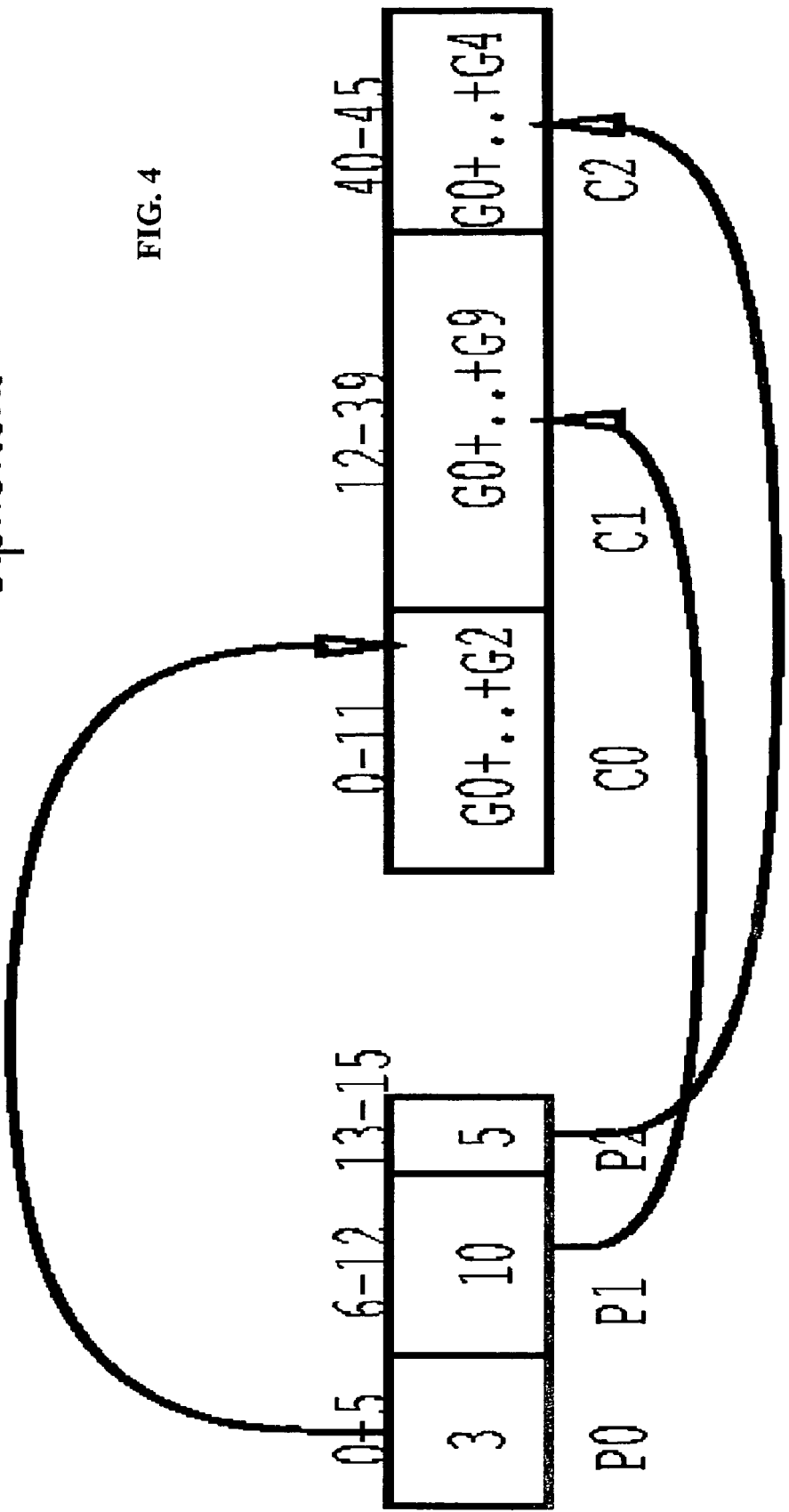
FIG. 4 is a diagram illustrating the mapping of a 16 bit plaintext into a 46 bit ciphertext following the basic encryption scheme of the present invention.

FIG. 4 illustrates the mapping of a 16 bit plaintext into a 46 bit ciphertext. The plaintext has three segments of length 6, 7, and 3 bits. The expansion factors for these segments are 2, 4, and 2 respectively, yielding three ciphertext segments of length 12, 28, and 6 bits.

1.2.2. Encoding Values

Let $V_{Pi}$ be the numeric value of the segment $P_i$. The numeric value of the corresponding ciphertext segment Ci is given by $$V_{Ci} = \sum_{j=0}^{VPi} G^j$$

where $G^j$ represents the $j^{th}$ call to the random number generator G and its value is given by
$G^j$=integer value $\chi$ [0, $2^{|Ci|-|Pi|}-1$] if j=0 and
$G^j$=integer value $\chi$ [1, $2^{|Ci|-|Pi|}$] otherwise That is, the encoded value of V is given by the sum of V+1 random numbers. For example, in FIG. 4, the encoded value of the first segment is given by $G^0+G^1+G^2$.

The seed for the random generator is obtained by concatenating the private key K with the column name and another arbitrary string so that this seed is different from the one obtained in the partitioning step. G is initialized with the same seed for encoding all of the plaintexts in a column. Thus, the same ciphertext is obtained for identical plaintexts.

Making V+1 calls ensures that there is always at least one call to G. By allowing the first call (j=0) to generate a value of 0, we allow the possibility that the value of $C_i$ can be 0. By insisting that subsequent calls generate nonzero values, we are ensured of the following:

Observation 3: Let $P^1$ and $P^2$ represent two plaintexts and let $V_i^1$ and $V_i^2$ respectively be the numeric values of their $i^{th}$ segments $P_i^1$ and $P_i^2$. The numeric value of $C_i^1$ will be greater than that of $C_i^2$ iff $V_i^1 > V_i^2$.

Since the same partitioning scheme is used for encoding all the plaintexts in a column, the following is immediate:

Observation 4: Let $P^1$ and $P^2$ be two plaintexts which are such that their numeric values differ initially in segment i and they have identical values in all segments j, j<i. Let $V_i^1$ and $V_i^2$ be the numeric values of the segments $P_i^1$ and $P_i^2$ respectively. Then $C^1$ v $C^2$ iff $V_i^1 > V_i^2$.

It then follows:
Observation 5: $C^1$ v $C^2$ iff $P^1$ v $P^2$.

Note that the numeric value of segment $P_i$ can at most be $2^{|Pi|}-1$. Therefore, the numeric value of $C^i$ can lie in range [0, $2^{|Ci|-|Pi|}-1+(2^{|Pi|}-1)\times(2^{|Ci|-|Pi|})$]. Thus, the maximum encoded value of $P_i$ can be $2^{|Ci|}-1$ and will not overflow $C_i$.

1.3 Decryption Algorithm

Decrypting a ciphertext C into the original plaintext P comprises the two following steps:

1. Identify Segments. Divide C as well as P into N segments used during encryption. This step is straightforward, given the knowledge of the private key K used at the time of encryption.
2. Decrypt Segments. Let the numeric value of the ciphertext segment $C_i$ be $V_{Ci}$. The numeric value $V_{Pi}$ of the corresponding plaintext segment $P_i$ is determined as follows:

$V_{Pi}$=smallest V such that $$\sum_{j=0}^{V} G^j = V_{Ci}$$

where G is initialized with the seed that was used at the time of encryption.

1.4 Parameter Values

The encryption scheme of the present invention has two parameters: i) the number of segments N, and ii) the maximum expansion factor $\Gamma$. In general, smaller values of N increase the length of the segments. At the time of encoding a segment Pi, its value $V_{Pi}$ determines the number of calls made to the random number generator G. Having larger values for $\Gamma$ increases the length of encrypted segments, and hence the value of $|C_i|-|P_i|$. Having larger values of $\Gamma$ increases the range of numbers generated by G. Of course, larger values of $\Gamma$ also increase the storage overhead.

Rather than fixing N in advance, the invention calls G to generate the length of the next segment from the range [minsize, maxsize]. We suggest using minsize=1 and maxsize=8 for the first segment, and using minsize=2 and maxsize=4 for subsequent segments for strings 16 bits in length or longer. The reason for two different sets of values will become apparent. Also, $\Gamma$=1.5 is a good choice. For this choice of $\Gamma$, the space overhead with the basic encryption scheme will be within 50%.

1.5 An End Condition

In the strategy just described for selecting segment lengths, the number of bits left in the last segment $P_{N-1}$ might be less than the length provided by G. If all plaintexts are of equal length, there is an easy solution for this problem. Simply take whatever bits are left as the length of the last segment. At the time of decryption, G will again give a larger length for the last segment. However, this length can easily be adjusted to the right value, since we know the total length of the plaintext and the length of all the previous segments.

If the plaintexts are of different lengths (see Section 2.2), the solution is a bit more involved. As above, the invention takes the remaining bits as the length of the last segment. However, the invention now makes another call to the random number generator to create an additional virtual plaintext segment and populate it with the amount of bit shortage in the last segment. The corresponding encrypted segment in the ciphertext is then used at the time of decryption to apply adjustment to the last true segment of the plaintext. Note that the suggested values of minsize=2 and maxsize=4 for determining $|P_i|$ (where i>0) have been orchestrated to work with this solution. Finally, observe that the encryption still remains order-preserving.

2. Embellishments

The Achilles' heel of the basic encryption scheme is its use of the same partitioning scheme across all plaintexts in a column. We next give two embellishments to remove this vulnerability:

1. But for the first segment, every distinct plaintext is segmented using a different partitioning scheme (Section 2.1).
2. The ciphertext obtained in the above step is re-encrypted to foil attacks based on identifying the first segment (Section 2.2).

We also discuss how null values are handled in Section 2.3.

2.1 Nonuniform Partitioning

To thwart an attacker seeking to decipher segment boundaries, the invention determines the partitioning of every plaintext independently.

2.1.1. Encryption Algorithm

The embellished algorithm for encrypting a given plaintext P into the ciphertext C is as follows:

1. Seed the random number generator G with the private key K concatenated with the column name.
2. $G^0$ determines the length of the first segment $P^0$.
3. To compute the length of the segment $P_i$, call G seeded with the private key K and concatenated with the contents of segments $P_0$ through $P_{i-1}$. Another call to G determines the expansion factor $\gamma_i$, which in turn determines the length of the ciphertext segment $C_i$.
4. Use the algorithm given with the basic scheme (Section 1.2.2.) to compute the encoded value of $P_i$.

Thus, the length of the first segment will be the same for all of the plaintexts in a column. But the lengths of all other segments for a plaintext depend on its contents and hence are likely to be different for distinct plaintexts. Note that two identical plaintexts will still be identically partitioned and hence will have identical ciphertext.

The encryption remains order-preserving due to the following:

Observation 6: Let $P^1$ and $P^2$ represent two plaintexts and let $V_i^1$ and $V_i^2$ respectively be the numeric values of their $i^{th}$ segments $Pi^1$ and $Pi^2$. Now:

If $V_0^1 > V_0^2$, then $C^1 \vee C^2$ irrespective of the lengths and values of subsequent segments $C_1, \ldots, C_{N-1}$. Similarly, for the case $V_0^2 > V_0^1$, $C^2 \vee C^1$.

If $V_0^1 = V_0^2$, then the length of the next segments $P_1^1$ and $P_1^2$ will be identical since G would have been seeded with the same value. Now, if $V_1^1 > V_1^2$, then $C^1 \vee C^2$, etc.

Note that with nonuniform processing, the ciphertexts of equal-length plaintexts might not be of the same length. Thus, the ciphertexts will become VARCHAR even for fixed length plaintexts. This is a virtue because it makes inferring the percentile of the corresponding plaintext of any ciphertext even harder. It is possible to adapt the encryption algorithm to generate fixed-length segments by appropriately adjusting the length of the last ciphertext segment.

2.1.2. Decryption Algorithm

Decryption proceeds from the most significant to the least significant segment as follows:

1. Determine $|C_0|$ by seeding G with the private key K concatenated with the column name and calling G twice, first to determine $|P_0|$ and then the expansion factor $\gamma_0$.
2. Decrypt $C_0$ to obtain $P_0$ using the method described in the basic scheme (Section 1.3).
3. To decrypt the next segment, seed G with the private key K concatenated with the decrypted plaintext obtained so far, etc. Continue until all segments have been thus decrypted.

2.2 Double Encryption

We first give a plausible attack that exploits the fact that the first segments in all of the plaintexts of a column are still of the same length. We then describe how this attack can be foiled by encrypting the ciphertexts one more time.

2.2.1 Attack

Let $P_0$ represent the first set of segments of all of the plaintexts in a column and $C_0$ represent the set of their ciphertexts. The basis of this attack is that the segments in $P_0$ are likely to be densely populated. That is, if the database is large and $|P_0|$ is not very big, it is reasonable to assume that if someone examined the segments in $P_0$, all of $i \chi [0, 2^{|P0|}-1]$ will be found.

Assuming that the attacker has access to the complete encrypted database, here is an algorithm for guessing $|P_0|$:
1. Sort all the plaintexts belonging to the column of interest.
2. Starting with 1, use increasing integer values as the guess for $|P_0|$, as long as a most significant segment $C_0$ can be found that contains exactly 2 $|P_0|$ distinct values.

Because of the nonuniform lengths for the rest of the segments, the above attack is not effective for discovering subsequent segments. However, the attacker can decipher the percentiles of a ciphertext as follows: assign to $C^i$ the ordinal position of the content of $C_0^i$ relative to the other distinct values.

FIG. 5 illustrates this attack. The attacker guesses that $|P_0|=3$. He finds that if he assumes $|C_0|=6$, then $C_0$ contains exactly 8 distinct values. He can now proceed to assign plaintext value of 0 to the ciphertext $C_0^0=000100$, value if 1 to $C_0^1=000111$, etc. He still cannot assign exact plaintext value to any of the ciphertexts $C^i$, but he can assign percentile to them.

2.2.2. Final Algorithm

We now present a defense against the attack presented above. First note that of the possible $2^{|C0|}$ distinct strings that the first segment of C may contain, at most $2^{|P0|}$ can actually be present since the encrypting algorithm is monoalphabetic (i.e. it maps each distinct plaintext to one distinct ciphertext). Because $|C_0| > |P_0|$, the segments in $C_0$ will be sparsely populated. So, if we encrypt C again, treating it as a plaintext, but ensure that the first segment this time is bigger than $|C_0|$, we have destroyed the basis of the attack. The price paid is the increase in storage requirement by another $\gamma$ factor.

Here is the double encryption algorithm, which is believed to be the best mode of carrying out the invention:

1. Encrypt P into C, using the nonuniform partitioning encryption (Section 2.1.1.).
2. Now encrypt C, giving the final ciphertext CC. The nonuniform partitioning encryption is used again for this step, except care is taken to ensure the following:

The random number generator is initialized with a different seed. For instance, G can be seeded by adding an arbitrary string to the concatenation of key K and the column name. This change in seed results in a partitioning different from one used during the first encryption.

The length of the first segment while treating C as the ciphertext is bigger than the length of $C_0$ during the first encryption.

FIG. 6 illustrates double encryption. The partitionings used in the two stages are different. Also, the length of the first "plaintext" segment during the second encryption is bigger than that of the first ciphertext segment during the first encryption.

Note that the double encryption does not prevent an attacker from guessing the length of the first segment of CC. However, this discovery is of little value, since the attacker cannot assign ordinal values to the encrypted strings in CC because the first segment in CC (treated as ciphertext) is no longer dense. CC cannot also be directly decrypted into P because the segment lengths during the second encryption are determined independent of those used during the first encryption.

Since the encryption of P into C is order preserving and so is the encryption of C into CC, it is apparent that:

Observation 7: The encryption of P into CC is order preserving.

Decryption is straightforward. First, CC is decrypted into C, which in turn is decrypted into P. The decryption algorithm described in Section 2.1.2. is used for both the steps.

Note that if we choose the maximum expansion factor $\Gamma$ to be 1.5, the expected storage overhead even after double encryption will be less than 100%.

2.3 Null Values

When sorting the values of a column, null values can either rank high or low. We consider the case where nulls rank high as in the DB2 database system [5].

The essential idea is to encrypt a plaintext null by assigning any one of the random values which is greater than the largest encrypted value of the column. Care is taken to ensure that the encryption of the largest plaintext value leaves room for the several possible encryptions of a null value. Having multiple ciphertexts for a null value is a safeguard against an attack employing frequency analysis if a column contains several null values. It is also important to choose the starting range of encrypted values of a null just beyond the largest legal value to avoid an attack that tries to detect the boundary between the legal and null values.

Suppose $C^{max}$ is the encrypted value of the largest legal value of an attribute A. The test for nullness of A now becomes $A > C^{max}$. Similarly, a predicate of the form $A > C$ is rewritten as $A > C \wedge A \leq C^{max}$ to exclude nulls from the result.

Experiments

We empirically studied the following characteristics of the encryption scheme:
1. Does the scheme have an exposure to a percentile attack?
2. What is the performance impact of integrating the scheme in a database system.

We use a DB2 implementation of the scheme to study the latter.

Robustness Experiment

In this experiment, we study if the scheme succeeds in mangling the distribution of the plaintext values. If an encryption scheme preserves distributions, an attacker can make a good estimate of the true value of a ciphertext simply by examining the distribution of the ciphertext values.

Figure 7A:
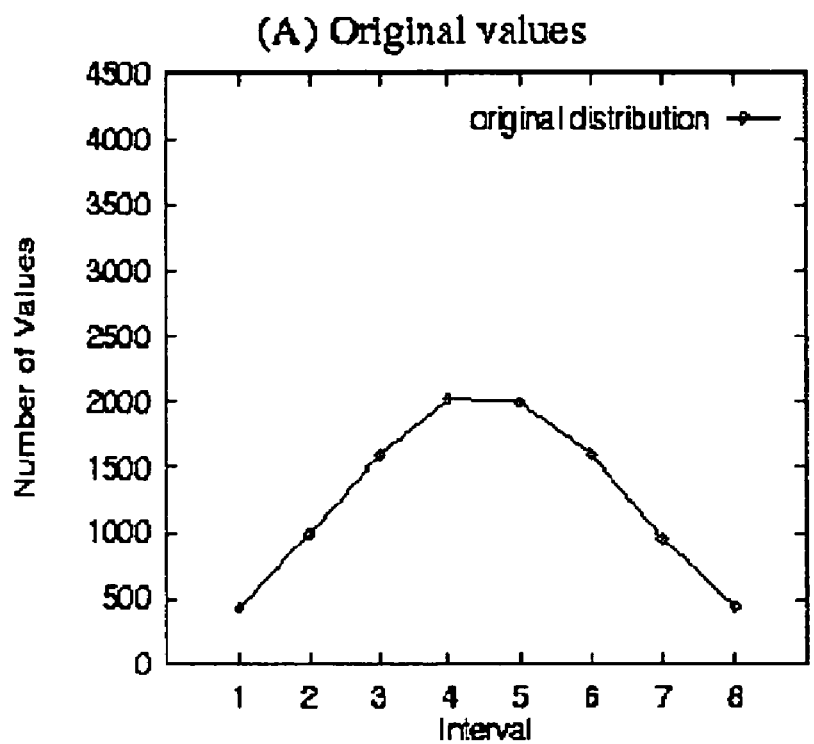
Figure 7B:
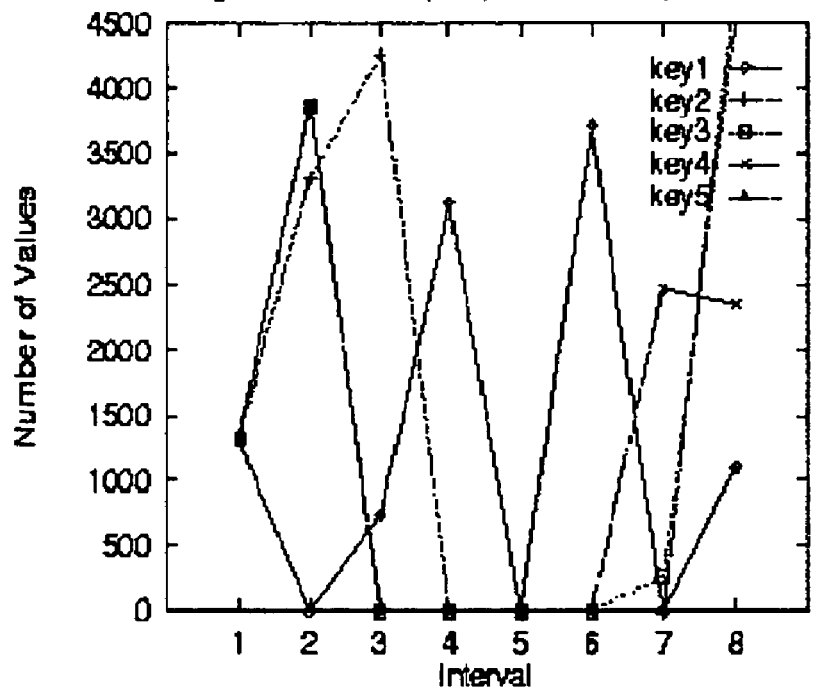
Figure 7C:
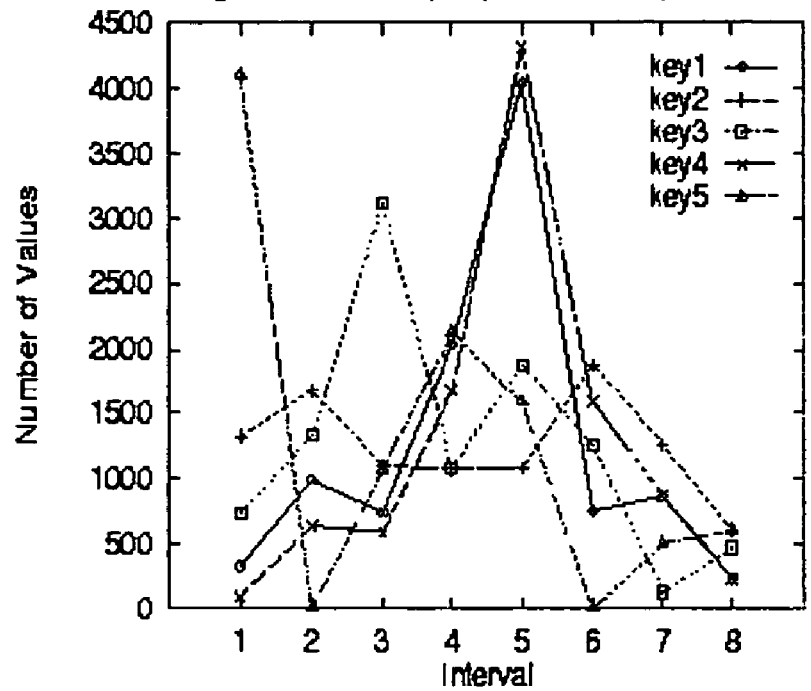
Figure 7D:
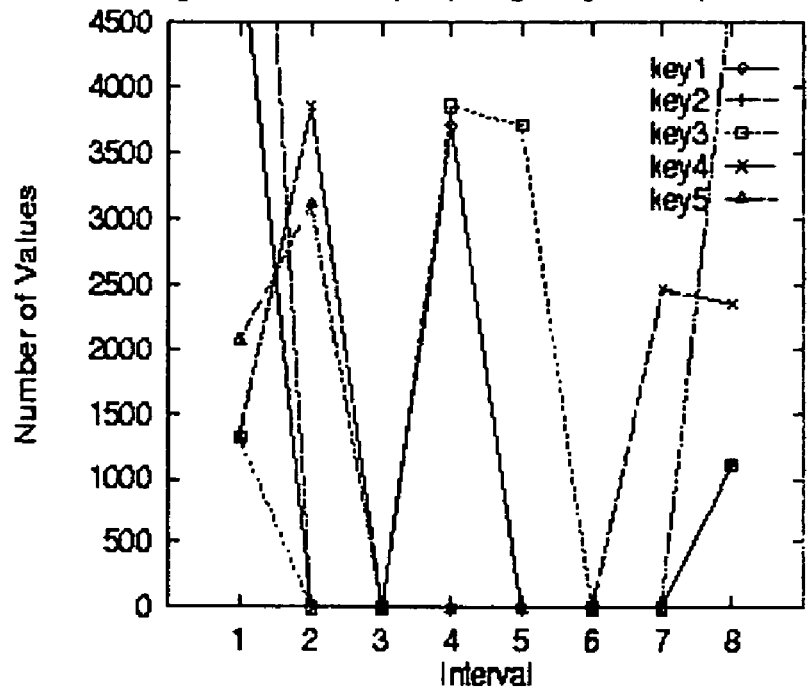
Figure 8A:
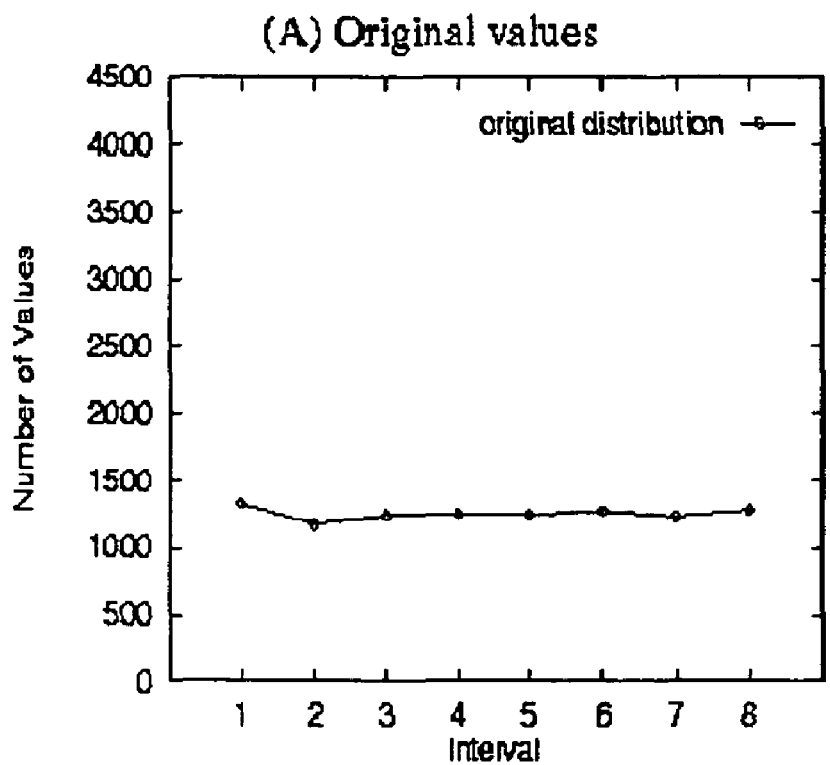

We use two synthetic datasets in this experiment. The first dataset consists of 10,000 32-bit integer values sampled from a Gaussian distribution. The second dataset consists of the same number of integer values, but sampled from a Uniform distribution. FIG. 7(a) and FIG. 8(a) show these distributions.

We encrypted each dataset using three different parameter settings. These settings were chosen to generate fixed length encryptions to be able to obtain meaningful numeric values for studying distributions. For every setting, we did 5 encryptions using different private keys. The settings were termed (B), (C), and (D) as follows:

(B)=Fixed length segments in plaintext, each being of length 2 bits; Constant expansion factor of 1.5 for every segment.
(C)=Fixed length segments in plaintext, each being of length 4 bits; Constant expansion factor of 1.5 for every segment.
(D)=Variable length segments in plaintext in the range 2-4 bits; Constant expansion factor of 2.0 for every segment.

Figure 8B:
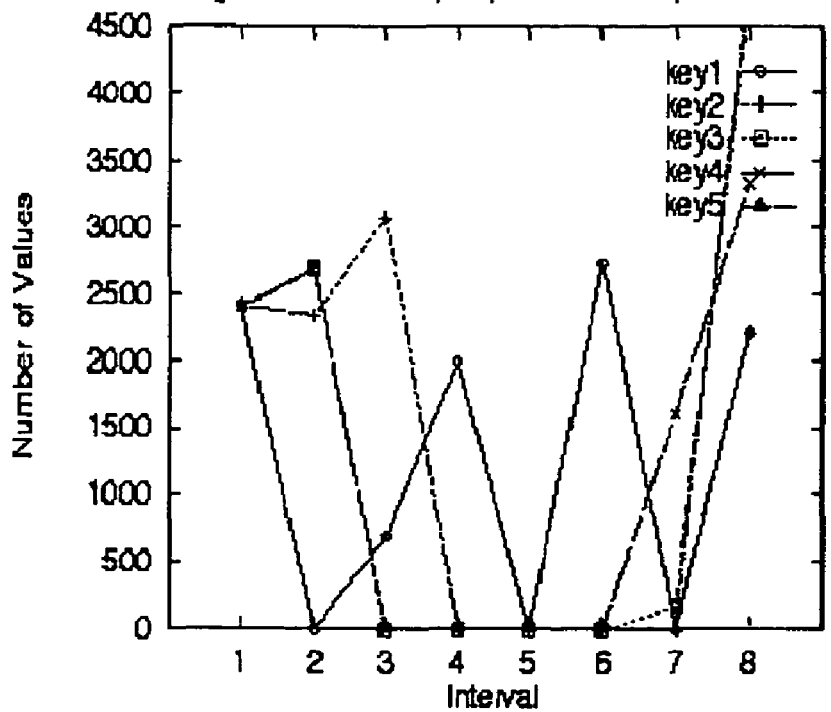

FIGS. 7 and 8 show the results. Clearly, both for Gaussian and Uniform datasets, the ciphertext distributions do not resemble their corresponding plaintext distributions. The distortion reduced somewhat as the fixed segment length was increased from 2 (setting B) to 4 (setting C). An increase in segment length results in an increase in the number of calls to the random number generator that has somewhat of an averaging effect. However, once we varied segment lengths between 2 and 4 in setting D, the distributions were again completely mangled.

Performance Experiments

This set of experiments was conducted by integrating the encryption scheme into DB2 Version 7. The algorithms were implemented in Java and experiments were run using version 1.3.0. of the Java VM on a Microsoft Windows 2000 version 5.00.2195 Service Pack 2 workstation with a 1 Ghz Intel processor and 512 MB of memory. We investigated the time overhead of both encryption and decryption through these experiments.

Encryption Overhead

We studied the encryption overhead by measuring the impact of encryption on the insertion of 10,000 tuples in a single-attribute table. Table 1 below shows the results:

TABLE 1

| | | Time (in milliseconds) required to insert 10,000 tuples | | |
|---|---|---|---|---|
| \|Pi\| | γi | plaintext | insert encrypted | encrypt & insert |
| 2 | 1.5 | 69370 | 88357 | 143160 |
| 4 | 1.5 | 68489 | 86595 | 120534 |
| 2-4 | 2 | 65875 | 86725 | 146050 |

The "plaintext" column shows the time required to insert plaintext values represented as 32 bit integers.

The "insert encrypted" column shows the time required to insert encrypted integers as bit data type column values. These timings do not include the encryption time and indicate the overhead due to the increased length of encrypted values.

The "encrypt & insert" column shows the time required to first encrypt the plaintext integers, and then insert the encrypted values as bit data type column values.

The first two columns show the settings of the parameters of the encryption scheme.

These results are encouraging as they show that encryption only doubles the insertion time. About 80% of the overhead is due to the time spent in the encryption algorithm.

Decryption Overhead

We studied the decryption overhead by measuring the performance impact on the retrieval of 10,000 tuples from a single-attribute table. Table 2 shows the results:

TABLE 2

| | | Time (in milliseconds) required to retrieve 10,000 tuples | | |
|---|---|---|---|---|
| \|Pi\| | γi | plaintext | insert encrypted | encrypt & insert |
| 2 | 1.5 | 50 | 141 | 21982 |
| 4 | 1.5 | 40 | 160 | 13930 |
| 2-4 | 2 | 101 | 151 | 19928 |

The "plaintext" column shows the time required to retrieve plaintext values stored as 32 bit integers.

The "retrieve encrypted" column shows the time required to retrieve 10,000 encrypted integers (SELECT*query).

These timings do not include the time needed for decrypting encrypted values in the result.

The "retrieve & decrypt" column shows the time required to retrieve 10,000 encrypted integers plus the time required to decrypt them.

These results show a factor of 1.5 to 4 increase in the retrieval time because of the increase in the length of data items being handled, which is reasonable. However, the time to decrypt encrypted values is excessive. A tuned C implementation of the decryption algorithm might reduce this overhead, though that is unlikely to be adequate. Another approach is to investigate hardware assists for overhead reduction. It is worth noting that IBM mainframes have historically provided hardware support for encryption.

A general purpose computer is programmed according to the inventive steps herein. The invention can also be embodied as an article of manufacture—a machine component—that is used by a digital processing apparatus to execute logic to perform the inventive method steps herein. The invention may be embodied by a computer program that is executed by a processor within a computer as a series of computer-executable instructions. These instructions may reside, for example, in RAM of a computer or on a hard drive or optical drive of the computer, or the instructions may be stored on a DASD array, magnetic tape, electronic read-only memory, or other appropriate data storage device. The invention can also be embodied as a data management service.

While the particular SYSTEM AND METHOD FOR FAST QUERYING OF ENCRYPTED DATABASES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for".

REFERENCES

[1] R. Agrawal, J. Kiernan, R. Srikant, and Y. Xu. Hippocratic databases. In 28$^{th}$ Int'l. Conference on Very Large Databases, Hong Kong, China, August 2002.

[2] N. Ahituv, Y. Lapid, and S. Neumann. Processing encrypted data. Communications of the ACM, 30(9):777-780, 1987.

[3] L. Bouganim and P. Pucheral. Chip-secured data access: Confidential data on untrusted servers. In Proc. of the VLDB Conference, p. 131-142, Hong Kong, China, August 2002.

[4] C. Boyens and O. Gunther. Trust is not enough: Privacy and security in ASP and web service environments. In 6$^{th}$ East-European Conference on Advances in Databases and Information Systems, Bratislava, Slovakia, September 2002.

[5] D. Chamberlin. A Complete Guide to DB2 Universal Database. Morgan Kaufmann, 1998.

[6] D. Comer. The ubiquitous B-tree. ACM Computing Surveys, 11(2):121-138, June 1979.

[7] Z. J. Czech, G. Havas, and B. S. Majewski. An optimal algorithm for generating minimal perfect has functions. Information Processing Letters, 43(5):257-264, 1992.

[8] D. Denning. Cryptography and Data Security. Addison-Wesley, 1982.

[9] J. Domingo-Ferror and J. Herrera-Joancomarti. A privacy homomorphism allowing field operations on encrypted data, 1998.

[10]. J. Domingo-Ferror. A new privacy homomorphism and applications. Information Processing Letters, 60(5):277-282, 1996.

[11] J. Feigenbaum, M. Y. Liberman, and R. N. Wright. Cryptographic protection of databases and software. In Proc. of the DIMACS Workshop on Distributed Computing and Cryptography, 1990.

[12] E. A. Fox, Q. F. Chen, A. M. Daoud, and L. S. Heath. Order-preserving minimal perfect hash functions and information retrieval. ACM Transactions on Information Systems (TOIS), 9:281-308, 1991.

[13] H. Hacigumus, B. R. Iyer, C. Li, and S. Mehrotra. Executing SQL over encrypted data in the database-service-provider model. In Proc. of the ACM SIGMOD Conf. on Management of Data, Madison, Wis., June 2002.

[14] H. Hacigumus, B. R. Iyer, and S. Mehrotra. Providing database as a service. In Proc. of the Int'l. Conf. on Data Engineering, San Jose, Calif., March 2002.

[15] A. Kerckhoffs. Le cryptographie militaire. Journal des Sciences Militaires, 9:5-38, January 1883.

[16] National Institute of Standards and Technology, U.S. Department of Commerce. Digital Signature Standard, May 1994.

[17] Oracle Corporation. Database Encryption in Oracle 8i, August 2000.

[18] R. Rivest. The MD5 message digest algorithm. RFC 1320, April 1992.

[19] R. L. Rivest, L. Adelman, and M. L. Dertouzos. On data banks and privacy homomorphisms. In Foundations of Secure Computation, p. 169-178, 1978.

[20] B. Schneier. Applied Cryptography. John Wiley, second edition, 1996.

[21] D. X. Song, D. Wagner, and A. Perrig. Practical techniques for searches on encrypted data. In IEEE Symp. On Security and Privacy, Oakland, Calif., 2000.

[22] D. R. Stinson. Cryptography: Theory and Practice. CRC Press, 2$^{nd}$ edition, 2002.

[23] R. Vingralek. Gnatdb: A small-footprint, secure database system. In Proc. of the VLDB Conference, p. 884-893, Hong Kong, China, August 2002.

We claim:

1. A non-transitory computer program product for automatically querying encrypted data, comprising:

a storage medium readable by a processing circuit and storing instructions for execution by the processing circuit for performing a method comprising:

partitioning plaintexts into a number of segments, wherein each plaintext comprises a plurality of values, wherein a length of each segment is selected from a range of values by calling a cryptographically secure pseudorandom number generator at least one time;

encrypting each plaintext in an order-preserving segmented manner, yielding a corresponding ciphertext for each plaintext, wherein each ciphertext comprises values associate with each corresponding ciphertext;

performing comparison queries on the values of the ciphertexts; and decrypting query results.

2. A general purpose computer system for automatically querying encrypted data, the general purpose computer system comprising:

a memory; and a processor communicatively coupled to the memory, the processor adapted to perform a method comprising:

partitioning plaintexts into a number of segments, wherein each plaintext comprises a plurality of values, wherein a length of each segment is selected from a range of values by calling a cryptographically secure pseudorandom number generator at least one time;

encrypting each plaintext in an order-preserving segmented manner, yielding a corresponding ciphertext for each plaintext, wherein each ciphertext comprises values associate with each corresponding ciphertext;

performing comparison queries on the values of the ciphertexts; and decrypting query results.

3. The system of claim 2, where the plaintexts are column values.

4. The system of claim 2, wherein each plaintext resides within a column, and where the partitioning is done only once for a given column.

5. The system of claim 2, wherein the length of each plaintext segment is variable.

6. The system of claim 5, wherein the calling a cryptographically secure pseudorandom number generator a number of times further includes using as a seed a private key concatenated with a first string.

7. The system of claim 6 wherein the first string is a name of a column from which plaintexts are selected for the encrypting.

8. The system of claim 2, wherein the encrypting includes encoding each segment of each plaintext into a corresponding segment of a corresponding ciphertext by calling a cryptographically secure pseudorandom number generator a number of times, using as a seed a private key concatenated with a first string and a second string.

9. The system of claim 8, wherein the first string is a name of a column from which plaintexts are selected for the encrypting and wherein the second string is an arbitrary string.

10. The system of claim 9, wherein the $i^{th}$ ciphertext segment is of length $\gamma_i \times |P_i|$, where $\gamma_i$ is a specified expansion factor and $|P_i|$ is the length of the corresponding plaintext segment.

11. The system of claim 9, wherein $\gamma_i$ is 1.5.

12. The system of claim 8, wherein the encoding comprises summing the results of a number (j) of calls to the generator, with the result of the $j^{th}$ call given by $G^j$=integer value $\chi$ [0, $2^{|Ci|-|Pi|}$−1] if j=0 and $G^j$=integer value $\chi$ [1, $2^{|Ci|-|Pi|}$] otherwise.

13. The system of claim 2, wherein the comparison operations include at least one of: equality queries, range queries, MIN aggregations, MAX aggregations, COUNT aggregations, GROUPBY operations and ORDERBY operations.

14. The system of claim 2, wherein the decrypting comprises:

partitioning each ciphertext into segments as in the encrypting;

initializing the generator with a seed used in the encrypting; and computing the numeric value ($V_{pi}$) of each plaintext segment ($P_i$) as a smallest value such that $\Sigma_{j=0}^{V} G^j = V_{Ci}$, where $V_{ci}$ is a numeric value of the corresponding ciphertext segment.

15. The system of claim 14, wherein the length of a last segment is the number of remaining plaintext bits.

16. The system of claim 14, further comprising, when plaintexts are of different lengths, calling the generator again to create an additional virtual plaintext segment populated with an amount of bit shortage in a last segment.

17. The system of claim 2, wherein each plaintext is independently partitioned.

18. The system of claim 17, wherein independent partitioning comprises:

seeding the generator with the private key concatenated with a column name;

selecting the length of a first segment according to the generator output;

calling the generator using as a seed a private key concatenated with the contents of previous segments to compute lengths of each subsequent segment; and calling the generator again to determine expansion factor $\gamma_i$.

19. The system of claim 18, wherein the encrypting comprises:

encoding each segment of each plaintext into a corresponding segment of a corresponding ciphertext using a private key concatenated with a first string and a second string; and encoding each ciphertext segment using a different generator seed.

20. The system of claim 2, wherein plaintext nulls are encrypted by assigning any one of a random value that is greater than a largest encrypted value of a column, so that multiple ciphertexts are created for nulls.

21. A data management service for automatically querying encrypted data, comprising:

performing on a processor within an information processing system the following:

partitioning plaintexts into a number of segments, wherein each plaintext comprises a plurality of values, wherein a length of each segment is selected from a range of values by calling a cryptographically secure pseudorandom number generator at least one time;

encrypting each plaintext in an order-preserving segmented manner, yielding a corresponding ciphertext for each plaintext, wherein each ciphertext comprises values associated with each corresponding ciphertext;

performing comparison queries on the values of the ciphertexts; and decrypting query results.

22. A method for automatically querying encrypted data, comprising:

performing on a processor at an information processing system the following:

partitioning plaintexts into a number of segments, wherein each plaintext comprises a plurality of values, wherein a length of each segment is selected from a range of values by calling a cryptographically secure pseudorandom number generator at least one time;

encrypting each plaintext in an order-preserving segmented manner, yielding a corresponding ciphertext for each plaintext, wherein each ciphertext comprises values associated with each corresponding ciphertext;

performing comparison queries on the values of the ciphertexts; and decrypting query results.

* * * * *